Feb. 27, 1934.  D. SAMIRAN  1,948,543
FLUID SEGREGATOR
Filed March 12, 1930  4 Sheets-Sheet 1
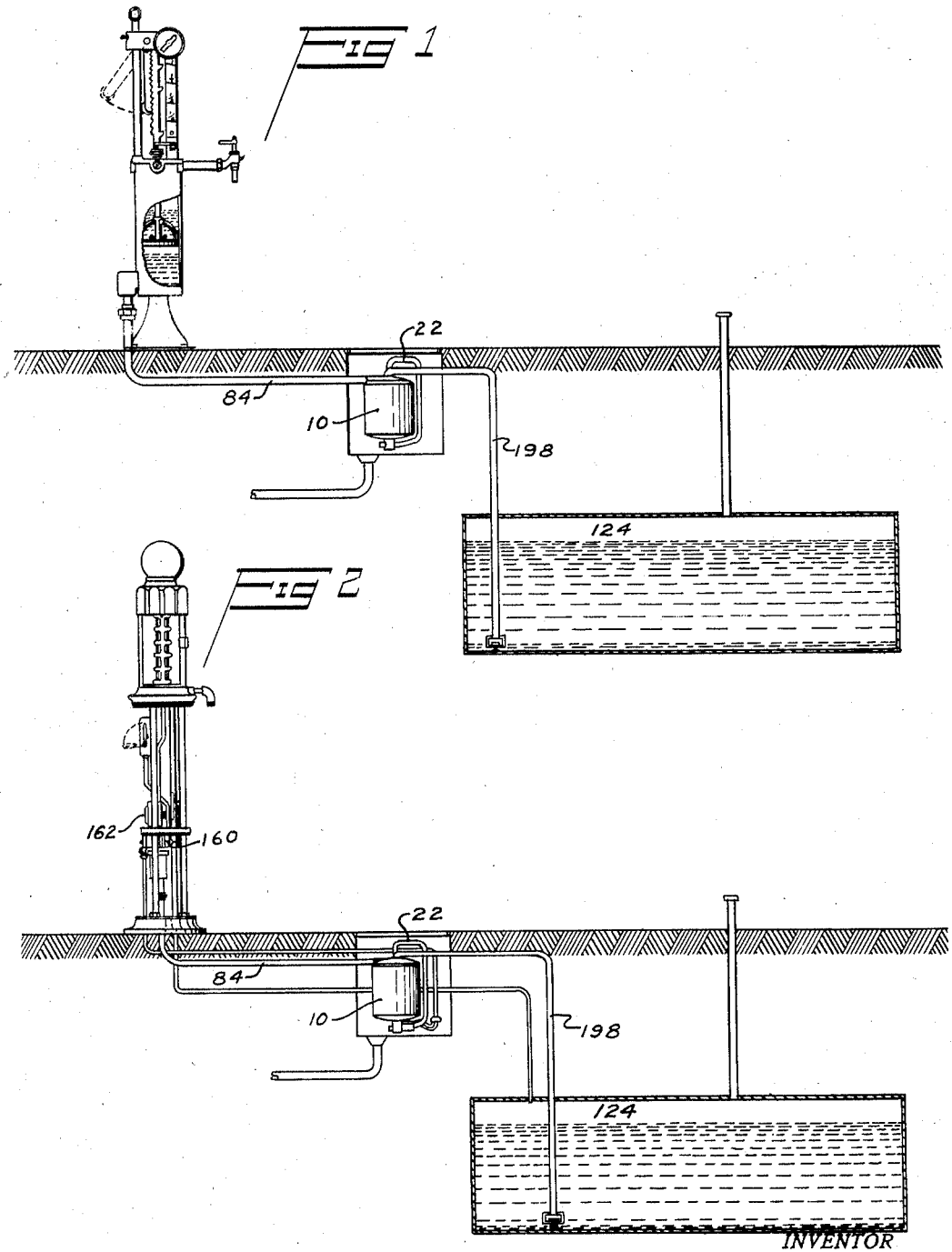
INVENTOR
David Samiran.
BY Robert H. Young
ATTORNEY

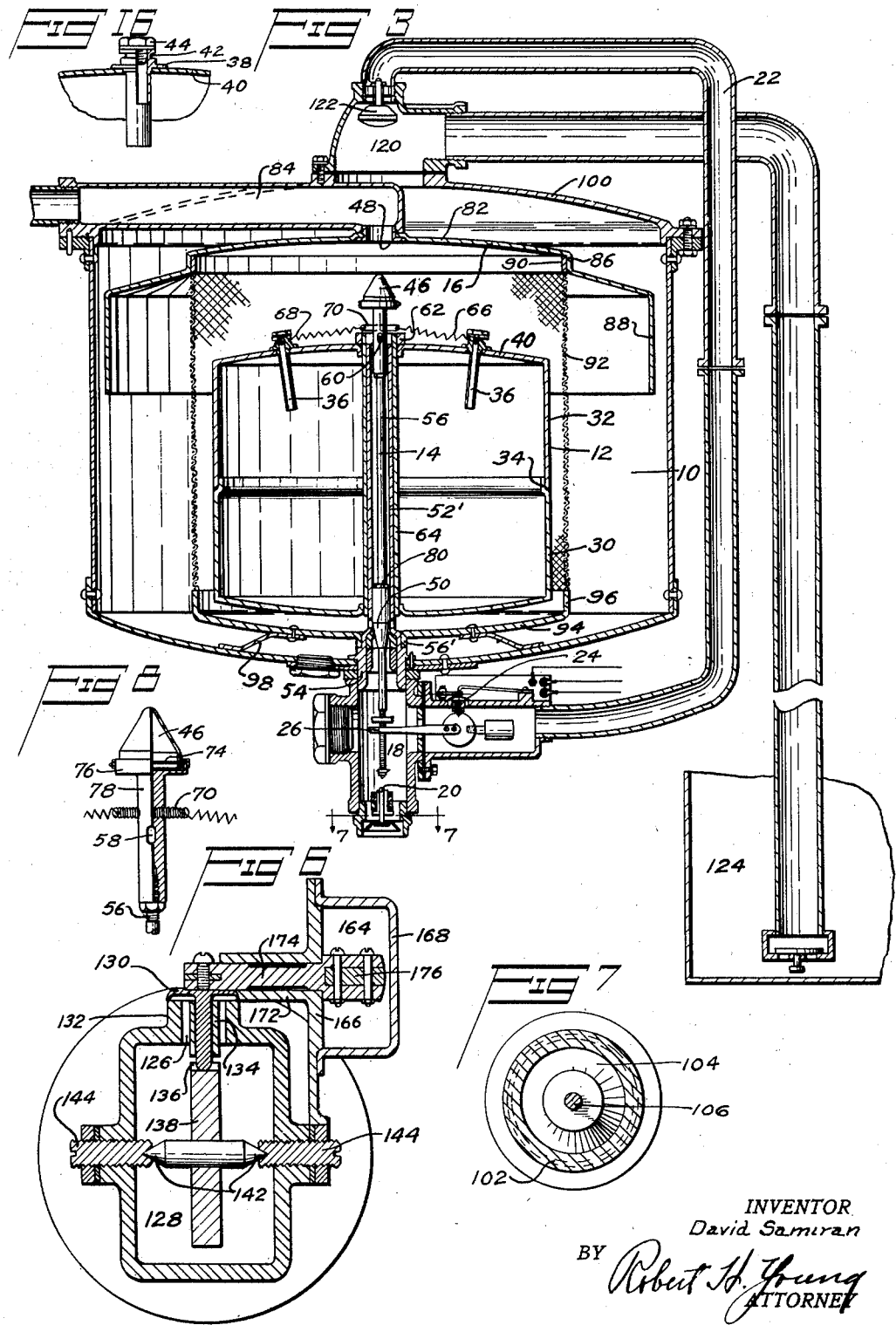

Feb. 27, 1934.     D. SAMIRAN     1,948,543
FLUID SEGREGATOR
Filed March 12, 1930     4 Sheets-Sheet 3
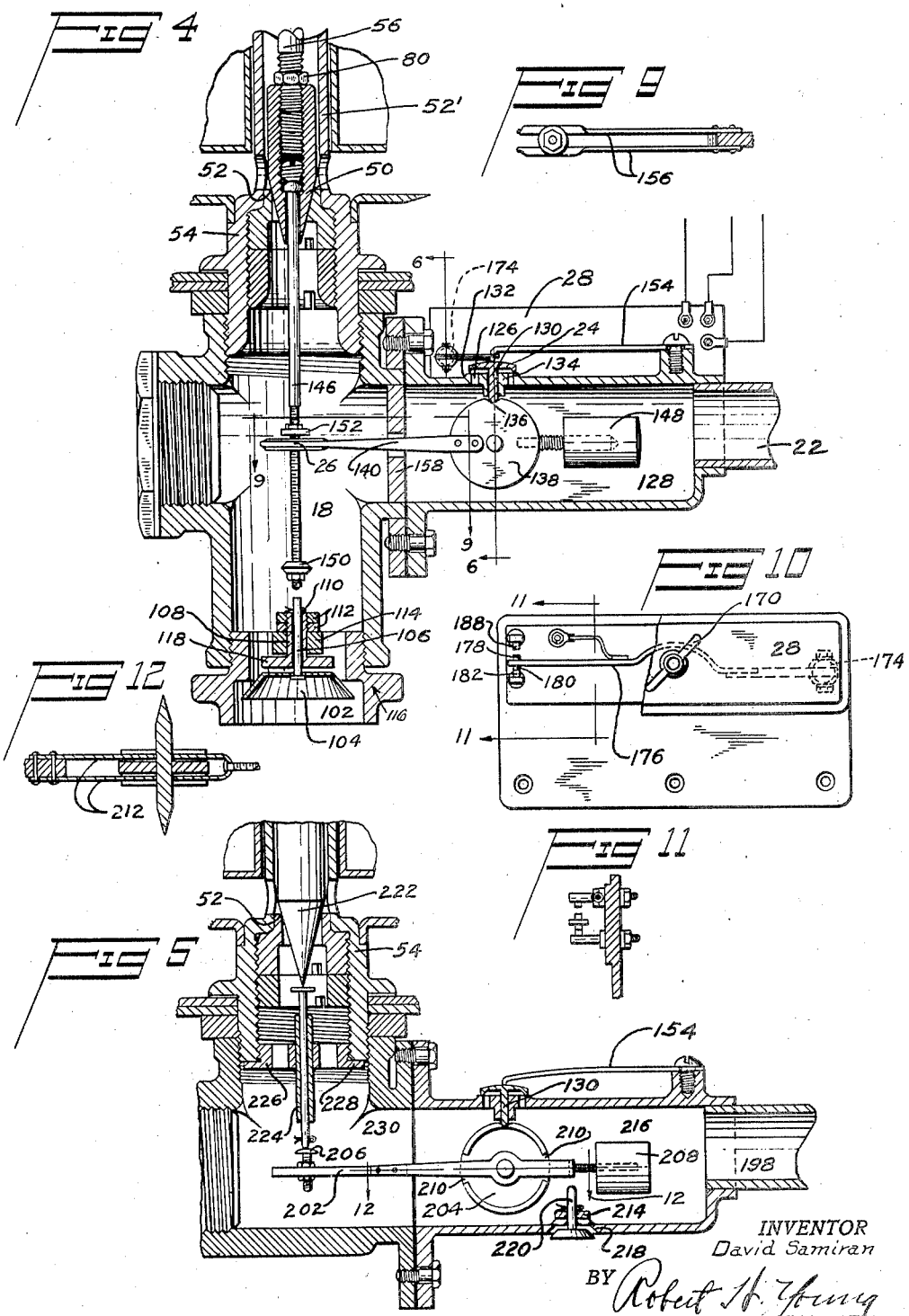
INVENTOR
David Samiran
BY Robert H. Young
ATTORNEY Feb. 27, 1934.　　　D. SAMIRAN　　　1,948,543
FLUID SEGREGATOR
Filed March 12, 1930　　　4 Sheets-Sheet 4
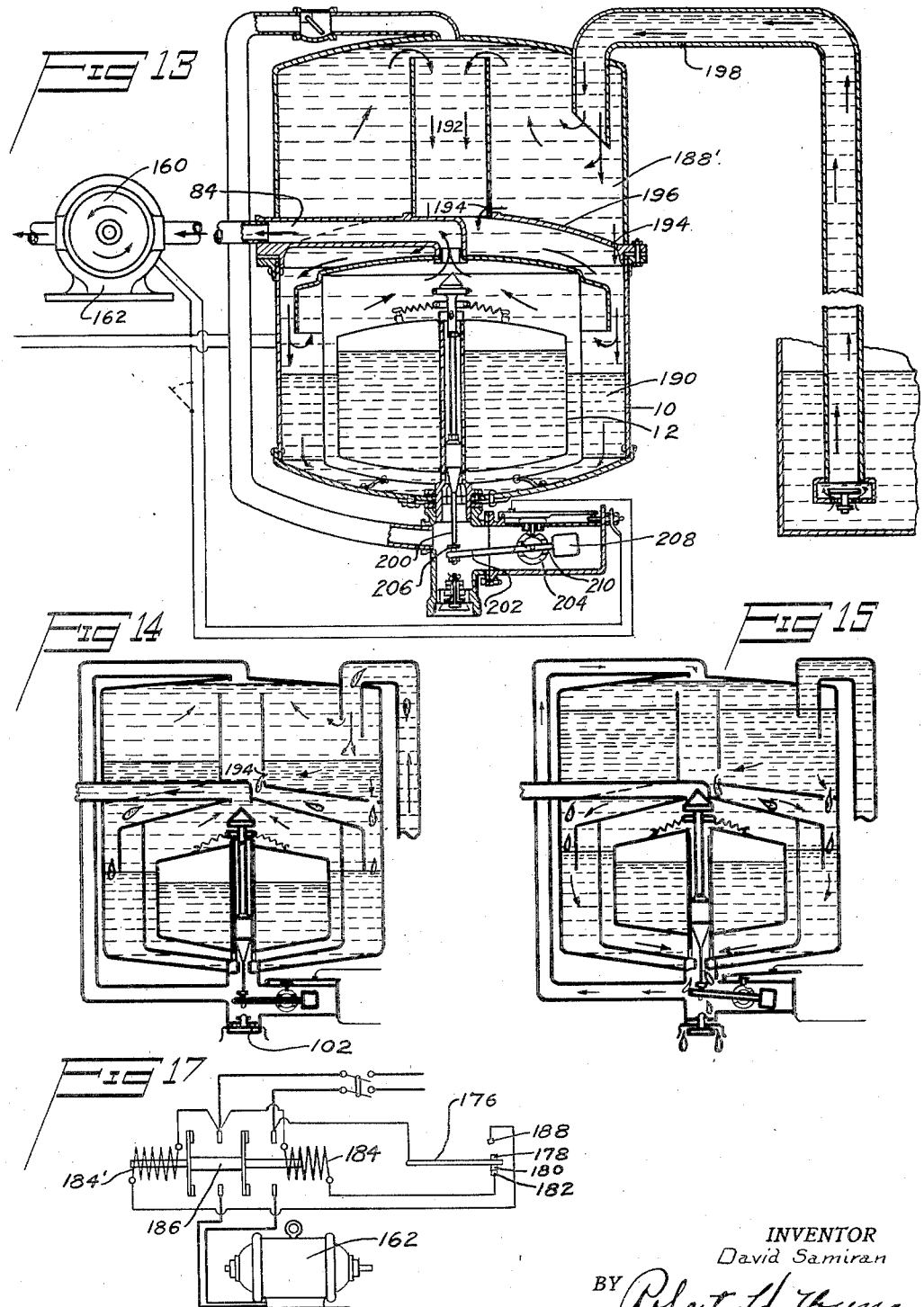
INVENTOR
David Samiran
BY Robert H. Young
ATTORNEY Patented Feb. 27, 1934

1,948,543

UNITED STATES PATENT OFFICE 1,948,543

FLUID SEGREGATOR

David Samiran, Dayton, Ohio, assignor of one-half to Phillips Melville

Application March 12, 1930. Serial No. 435,243

27 Claims. (Cl. 210—54)

REISSUED

MAR 4 – 1941

(Granted under the act of March 3, 1883, as amended April 30, 1928; 370 O. G. 757)

The invention described herein may be manufactured and used by or for the Government for governmental purposes, without the payment to me of any royalty thereon.

This invention relates to the class of fluid segregators for the automatic isolation of fluids of different specific gravities and more particularly to force-feed fluid systems in which a separation of non-miscible fluids of different specific gravities is effected and is especially adapted to fluid supply systems in which the supply tank is practically inaccessible and in which the fluid is fed from the source of supply by suction impelling means.

It is well-known that while normally certain fluids of different specific gravities such as water and oil or water and gasoline are not miscible, these fluids when agitated will form an emulsion or a mixture that is not readily separable. When such non-miscible fluids are present in a force-feed fluid system and the tank is inaccessible to permit of a gravitational segregation of the fluid of heavier specific gravity that has settled to the bottom thereof, and it is desirable to isolate these fluids from each other, it will be apparent that such isolation must take place before passing through the pump or other suitable impelling means for the mechanical action of the latter tends to emulsify the components which thereafter have no opportunity to separate before reaching the point of delivery, due to the velocity of their passage through the delivery pipes.

To this end applicant's invention has for its objects to provide a fluid supply system in which a fluid segregator is interposed between and cooperates with the source of fluid supply and pump to automatically effect the separation of the undesirable components from the fluid prior to its discharge through the pump and immediately after it leaves the source of supply; to provide in a segregator system for the isolation of fluids of different specific gravities having a suction feed, means whereby the vacuum established in the segregator by said feed means is maintained to permit flow of fluid from the source of supply when the feed means is in operation, and means whereby the vacuum is destroyed when the feed means is not in operation to effect an intermittent segregation of said fluids; to provide in a segregator system having a segregator provided with a float operated needle valve, means for co-operating with said valve to control the flow of fluids into and out of the float chamber; to provide in said segregator system means for cooperating with said suction feed means to control the flow of the lighter component from said segregator; and to provide in a segregator system, means whereby a large quantity of the fluid of heavier specific gravity is accumulated and segregated in a single discharge.

Another object of my invention is to provide in a segregator, an auxiliary or settling chamber having metering means to meter the quantity of fluid passing from said chamber to the float chamber so that a maximum quantity of fluid of heavier specific gravity may be accumulated in said auxiliary chamber and segregated by said segregator in a single discharge.

The foregoing features and others not heretofore mentioned are hereinafter described and claimed and are illustrated by the accompanying drawings. In the drawings:

Fig. 1 represents a diagrammatic view of a manually operated fuel dispensing system showing an automatic fluid segregator interposed between and forming a part of the fuel feed line from the underground supply tank and dispenser.

Fig. 2 represents a view similar to Fig. 1 showing the automatic fluid segregator applied to a power operated dispensing system.

Fig. 3 represents a vertical section of an automatic fluid segregator adapted for a power operated suction fluid feed system, some parts being broken to be shown.

Fig. 4 represents an enlarged vertical section showing the housing for some of the principal elements that control the automatic intermittent segregation of the heavier fluids from the lighter fluids.

Fig. 5 is a view similar to Fig. 4 showing a further embodiment of my invention.

Fig. 6 is a sectional view taken on the line 6—6 of Fig. 4 showing the relative arrangement of the switch housing and the control mechanism housing and their included elements.

Fig. 7 is a sectional view of the suction valve unit, the direction of the view being indicated by the lines 7—7 on Fig. 3.

Fig. 8 is a detail view partly in section showing the connection of the upper needle to the valve assembly.

Fig. 9 is a sectional plan view taken on the line 9—9 of Fig. 4 showing the arms of the follower a stop member for limiting the upward movement of the follower.

Fig. 10 is a side of the switch unit, the cover plate being broken away so as to show certain features that would otherwise be covered from view.

Fig. 11 is a detail sectional view taken on the line 11—11 of Fig. 10.

Fig. 12 is a sectional partial view taken on the line 12—12 of Fig. 5 and showing the follower and lifting member.

Fig. 13 represents a diagrammatic view of an improved fluid feed system including a segregator that is provided with a settling chamber and improved link mechanism for controlling the bleeder valve.

Fig. 14 represents a diagrammatic view of the operation of the segregator shown in Fig. 13 showing the fluids of heavier specific gravity being accumulated in the settling or auxiliary chamber while the fluid of lighter specific gravity is being suction fed to the dispenser.

Fig. 15 represents a diagrammatic view of the operation of the segregator showing the fluids of heavier specific gravity to have accumulated in the auxiliary and float chambers to a predetermined position therein, the upper valve closed to cut off the suction feed and the lower needle and suction valves open to permit the simultaneous segregation of the heavier fluids from both chambers.

Fig. 16 is a detail view of the stand pipe construction, and

Fig. 17 represents a wiring diagram of the circuit shown in Fig. 13.

In illustrating a preferred embodiment, my invention is shown in connection with a gasoline fluid dispensing system in which the suction feed of the fluid from the source of supply is accomplished either manually, as shown in Fig. 1, or by power means, as shown in Fig. 2. The system comprises a source of supply of gasoline that is located, as is the general custom, in an underground tank, a fluid segregator adapted to segregate fluids of heavier specific gravity from a fluid of lighter specific gravity, and a suction pump which may form a part of the discharge register, the segregator being interposed between the source of supply, preferably adjacent thereto, and the suction pump, and being adapted to receive the fluid to segregate the undesirable components prior to its being pumped to the discharge register.

The segregator mechanism is adapted to automatically segregate the undesirable components and embodies controlling means to automatically control the flow of fluid into and out of the segregator from the gasoline. When the suction feed is power actuated, the control means is further adapted to automatically control the operation of the suction device.

In the power actuated suction feed illustrated in Fig. 2 and described herein, a combination of valve means and electrical means is utilized, the valve means cooperating with the suction device to create a vacuum whereby a flow of fluid through the segregator mechanism is established and to destroy the vacuum when a predetermined quantity of undesirable component or components such as water in the dispensing of gasoline, has accumulated, to permit the automatic segregation thereof. It is to be understood, however, that the invention is not limited to suction actuated valve means for the establishment of the fluid flow through the segregator inasmuch as the valve means for atmospherically sealing the segregator may be electrically actuated.

The improved segregator illustrated, in connection with which the control means is particularly described, embodies the principles disclosed in United States Letters Patent 1,700,811 granted to me February 5, 1929, and includes a float chamber 10, a float 12 disposed within said chamber, a needle valve member 14 controlled by the float, and a housing 16 disposed within the float chamber for completely partitioning the float and valve mechanism within the float chamber.

The control means, according to the invention illustrated in Figs. 3 and 4 is disposed within a housing 18 and comprises a suction valve 20 that is suction actuated to atmospherically seal the float chamber, an air-bleed or by-pass 22 leading from the housing 18 to the upper portion of the float chamber 10, a bleeder valve 24 and link mechanism 26 actuated by the float operated needle valve member 14, the link mechanism being adapted to actuate the bleeder valve 24 which in turn controls a switch 28.

According to the design shown the float which is slidably mounted on the needle valve guide is constructed of two cylindrical sections 30, 32 having their open ends jointed together by telescoping the flange 34 formed on the upper edge of the cylinder section 30 within the cylinder section 32 and welding their abutting edges. The float 12 is ballasted, as shown in Fig. 13, by a liquid ballast in substantially the identical manner disclosed in my above referred to patent. The stand pipes 36 which are alike in construction, (see Fig. 3) are, however, positioned at the upper end of the float instead of at the bottom, as disclosed in my above referred to patent. The upper portion of each stand pipe is provided with a flange 38 that is secured in a suitable manner, such as welding, to the upper wall 40 of the float chamber and has annular groove 42 for a purpose hereinafter described. The stand pipe is interiorly threaded to receive a complementary threaded plug 44 for sealing the float after being ballasted.

The needle valve assembly comprises an upper needle valve 46 cooperating with a valve seat member 48 to control the outlet for the float chamber, a lower needle valve 50 cooperating with the valve seat member 52 to control the discharge opening of the float chamber and an adjustable needle valve stem 56, the valve seat member 52 being threaded within the threaded end or nipple 54 of the valve guide 52'. This needle valve assembly has a limited floating vertical movement relative to said float which floating action is effected by providing the needle valve stem 56 with a slot 58, (Figs. 3 and 8) to loosely receive a pin 60 that is secured to a collar 62 which forms a continuation of the float sleeve 64 and yieldingly securing said needle valve assembly to the float by means of coil springs 66, 68, the outer ends of which are secured within the annular grooves 42 and the inner ends of which are attached to an adjustable member 70 that is disposed at right angles to the needle valve stem and threaded therein to permit a lateral adjustment of the needle valve assembly to center the same relative to the float.

A characteristic novel feature of the valve assembly is that it is provided with means to permit the upper valve 46 to be properly seated in the valve seat 48. This feature, according to the illustrated embodiment shown in Fig. 8, is made possible by the valve extending in the form of a hollow cone which is adapted to be received within and loosely connected by means of a pin 74 to the circular flange 76 projecting upwardly from the upper valve stem 78. According to this arrangement, slight misalignment of the outlet valve seat 48 and discharge valve seat 52 can be encountered and still effect a proper seating of the valves 46, 50 respectively; since they are relatively movable to each other and to the float. With this arrangement a proper seating of the upper valve will be insured when the difference in the specific gravity of the heavier and lighter fluids is very small, giving to the float, of course, a comparatively small buoyant force; since the needle valve 46 is light and very little force is required to move the same laterally. In order to provide for the proper seating of the lower valve in valve openings of different size, the valve 50 is threaded over the stem 56 and can be adjusted vertically by loosening the lock nut 80.

The deflector 82, shown best in Fig. 3, is positioned above and supported in spaced relation to the float and float chamber, and is affixed to the outlet pipe 84 in such a manner as to deflect the incoming fluids towards the walls of the float chamber. This deflector 82 is constructed to provide an inner annular flange 86 and an outer annular flange 88. The inner flange forms a guide for a collar 90 that is secured to a sieve 92, while the outer flange projects substantially below the inner flange and forms a passage with the wall of the float chamber whereby the deflected incoming fluids are directed towards the bottom of the chamber and away from the sieve. A lower deflector 94 is arranged in spaced relation to the float and float chamber and is supported by means of an annular shoulder formed on the nipple 54 of the needle valve guide 52', to slidably receive the annular flange 56' that is centrally disposed and formed at the bottom of the deflector 94. The sieve is fixedly secured at one end to an upwardly presenting flange 96 of the deflector 94 and at its other end to the collar 90 which, as heretofore stated, is slidably received within the flange guide of the deflector 82. In order to insure a close contact between the upper edge of the collar and the deflector the bottom deflector is arranged to be yieldingly urged upwardly. This is accomplished by interposing a pair of flat springs 98 between the deflector and float chamber.

It will thus be seen that the sieve and bottom deflector can be removed as a unit by an upward lift after the top 100 of the float chamber to which the upper deflector and outlet pipe are attached, has been unbolted from the float chamber.

Since, as hereinbefore stated, it is desirable to segregate the heavier fluids from the lighter fluids, after the fluids leave the supply tank and before entering the suction pump, the segregator which is a part of the suction line must be air tight to permit the pumping of the fluid from the source of supply. Accordingly, the invention includes means for this purpose, said means as shown, comprising a valve unit 102 seated within the housing 18 that is detachably secured to and forms a continuation of the nipple 54. This valve unit is constructed to readily respond to the reduced pressure, effected within the float chamber when the suction pump is in operation, to atmospherically seal the segregator, thus producing an air tight suction line and is also provided with means to assist in breaking the vacuum in the float chamber when the suction pump is inoperative or when the suction produced by the pump is cut off to permit the segregation of an accumulation of the fluids of heavier specific gravity. As best shown in Fig. 4, the valve unit comprises a valve member having a bowl-shaped valve head 104 made of relatively light sheet metal and a valve stem 106 that is integral with the valve head. This valve is slidable within a relatively heavy plunger 108 and is provided with a stop such as a cotter pin 110 that passes through an opening in the valve stem and rests against the face of an adjusting nut 112 which serves as a stop for the plunger 108 which in turn is slidable within a bearing 114 made integral with the valve seat member 116. The plunger is also provided with a lower flange 118 which serves as a stop to limit its upward movement and is disposed in spaced relation to the valve head and bearing when the valve is in the open position. It will thus be seen that when the valve is in the open position, the suction pump will produce only a slight reduction of pressure in the float chamber, but inasmuch as the valve member is relatively light, it will require only a small pressure drop in the float chamber to effect an upward movement thereof. As the valve member, however, moves upward to close the valve, it engages with the plunger, the valve opening becomes more and more restricted, and the pressure drop is consequently increased to cause the plunger to be carried upward by the suction actuated valve member. The valve and plunger member will remain in the upward position as long as fluid is being sucked from the source of supply. When, however, the suction produced by the pump ceases either by reason of the pump being inoperative or because of the suction being cut off by the upper float operated valve 46, the valve and plunger members will tend to be restored by gravity to their lower positions whence any fluid of heavier specific gravity accumulated in the float chamber and housing will automatically be segregated.

Since the destroying of the vacuum in the float chamber is dependent to a large extent upon air seepage through the valve 102, which air must pass through and displace respectively the fluids in the float chamber, and also because the rate of opening of the valve is more or less dependent upon the speed with which the vacuum is destroyed, it will be seen that the segregation of the fluids under the conditions so far described is relatively slow. To increase the rate of vacuum reduction in the float chamber and, consequently, obtain a more rapid segregation of the fluids of heavier specific gravity, means is provided to bypass the air flow to the top of the float chamber as it enters the housing 18. Accordingly, the pipe 22 heretofore mentioned serves as an air passage and is suitably connected by means of a threaded connection at its lower end to the housing 18 and at its upper end to a hollow fixture 120 that is bolted to and has a common opening with the top of the float chamber. The upper end of the tube is provided with a suitable check valve 122 to prevent the loss through the tube and valve of the overflowing fluid in the register which fluid is normally returned to the supply tank 124. As shown in Fig. 3, according to my invention, this check valve 122 is of the floating type and is slidably supported in a bearing in the open end of the tube and is adapted to float in the fluid of lighter specific gravity.

It will, of course, be apparent to those skilled in the art, that, according to the design illustrated, as long as there is no accumulation of fluids of heavier specific gravity, the lighter fluids can be suction fed to the register without interruption. When, however, a predetermined quantity of the heavier fluids have accumulated in the float chamber, the upper valve member 46 will be floated into its valve seated position and the suction feed to the register will be temporarily discontinued. It is, of course, desirable, especially when the fluid is being dispensed from the register, to have the period of the temporary interruption as short as possible. To this end, I have provided means to further increase the rate of vacuum reduction in the float chamber and, consequently, cause a more rapid segregation of the heavier fluids. This means comprises an air bleed 24 referred to above, that is controlled by the float operated valve mechanism through link mechanism 26 to which it is operatively connected. The air bleed, as shown in Figs. 4 and 6 consists of perforations or ports 126 formed in the upper wall of the casing 128 which forms a part of and is attached to the housing 18. These perforations are opened or closed through a valve member 130, the head of which is seated on the boss 132 formed integral with the casing and encloses the perforations; and the stem of which is slidably guided in the bearing 134 and has its end resting in a notch 136 formed on a lifting member 138 that is fixedly secured to a follower 140. This follower is pivoted by means of trunnions 142 resting in bearings 144 that are adjustable to centralize the follower, and has one end forked to receive a plunger 146, the other end being threaded to receive a balancing counter weight 148. The plunger is detachably secured to and projects downwardly from the needle valve 50, see Fig. 4. The lower end of this plunger has threaded thereon stop members which are spaced to provide a lost motion connection between the plunger and the follower. These stop members are spaced a distance substantially the same as the distance between the upper valve seat 48 and the normal floating position of the upper valve 46. It will thus be seen that the follower is given but a slight up or down movement as the upper needle valve and lower needle valve approach their respective valve seats and that the bleeder valve will be correspondingly lifted out of or seated in the notch of the lifting member. The bleeder valve member 130 being yieldingly held in place by means of a flat spring 154 that has one end bearing on the valve head, and its other end attached to the casing.

The plunger 146 which is removable with the float operated valve mechanism is readily operatively connected to and detachably connected from the follower by providing the follower with a pair of forked arms 156 (Fig. 9). These arms are made of spring material and are sprung outwardly by the stop 150 as it passes between them. This springing action is facilitated by flaring the upper and lower edges of the arms 156 outwardly and by tapering the sides of stop 150 to form a wedge that is V-shaped in cross section. A plate 158 is disposed within the housing 18 and is provided with an opening to receive and limit the upward and downward movement of the follower when the plunger is disconnected or connected therewith.

The suction pump 160 as shown in Fig. 13 is actuated by an electric motor 162 which is automatically controlled to stop the pumping action when the upper valve member 46 is in closed position and to start the pumping action when the lower valve member 50 is in closed position. This is accomplished by means of the link mechanism heretofore described. While this mechanism is adapted to control the bleeder valve, it also serves to actuate through the bleeder valve member a switch that controls the operation of the suction pump. Any suitable make and break switch of the conventional type may be used for this purpose and is best shown in Figs. 6 and 10. The switch is adapted to alternately complete two circuits, the one circuit containing an electro-magnet to actuate a control switch for shutting off the suction pump motor, the other circuit containing an electro-magnet to actuate said control switch for starting said motor. The switch 28 is constructed as a separate assembly and housed in such a manner as not to be exposed to gasoline vapors; thus avoiding fire hazards. The switch mechanism is disposed within a housing 164 that is made of two parts, a back plate 166 and a front plate 168, the front plate being clamped by means of a clamp nut 170 to the back plate which in turn is bolted to the housing 18. The back plate is provided with a bearing 172 to receive a rocker shaft 174 which has one end projecting into the housing and its other end projecting outside thereof. The inner end of this shaft has secured thereto a contact arm 176 that is provided with contacts 178 and 180 on each face and is yieldingly urged downwardly by the spring 154 to make contact with contact 182 when the lower valve 50 is closed. This completes the electric circuit to energize an electro-magnet 184 which in turn throws in the control switch 186 to start the motor 162 when the main switch is closed. On the other hand the contact arm 176 is forced upwardly by the link mechanism through the bleeder valve to make contact with the contact 188 when the lower valve 50 is open and the upper valve 46 is closed. Movement of the contact arm upwardly and away from the contact 182 will have no effect upon the control switch 186 until contact is made with contact 188 at which time a second electro-magnet 184' is energized to open the switch 186 and stop the motor 162. Thus it will be apparent that it is only when contact is made with one contact or the other that the control switch is correspondingly thrown in or out. The contacts being spaced, it will be seen that the contact is permitted to have a movement corresponding with the movement of the needle valve member 14 and that the control switch is respectively thrown in or out when the needle valve assembly is in its lowermost position to close the valve 50 or in its upper position to close the valve 46.

A modification of my invention is shown in Fig. 13 in which the fluid segregating system is provided with a segregator that is similar to the segregator above described, but, in addition thereto embodies means to permit the accumulation and segregation of a relatively large quantity of the fluids of heavier specific gravity, and also embodies a modification of the link mechanism for operating the bleeder valve.

This segregator comprises an upper chamber 188' and a lower chamber 190. The upper chamber serves as a settling chamber to reduce the velocity of the incoming fluids, thereby permitting the natural separation of the heavier component from the lighter component and also serves in connection with a standpipe 192 that extends to nearly the top of the upper chamber and interconnects the same with the lower chamber, to permit an accumulation of the heavier fluids. A series of small openings 194 is provided in the partition 196, and also at the bottom of the standpipe, the aggregate open area of which is of such magnitude that, in the event the fluids entering the upper chamber 188' through the pipe 198, be of the heavier component when the suction flow commences, the heavier fluid will have accumulated up to substantially the top of the standpipe when the accumulation of the heavier fluid is of a predetermined quantity in the float or lower chamber. The size or the number of these openings is also dependent upon the size of the discharge valve opening; since, as heretofore described, it is desirable to segregate the accumulated heavier fluids both in the float chamber and in the settling or auxiliary chamber in a single discharge. Referring to the drawings, Fig. 14 diagrammatically illustrates that when the valve 102 is maintained in its closed position, the inflowing heavier fluids are being accumulated in the upper and lower chambers, and Fig. 15 illustrates that it is possible, in accordance with the design disclosed, for the heavier fluid to have accumulated up to nearly the top of the standpipe in the settling chamber when a predetermined quantity of the heavier fluid will have accumulated in the float chamber, at which time, the upper valve shuts off the suction flow, and the suction valve 102 is no longer maintained in the closed position; thus permitting the segregation of the heavier fluids to take place from both chambers simultaneously.

The link mechanism, as shown in this embodiment, comprises a plunger rod 200 and a follower 202, that is pivotally secured to and straddles a lifting member 204 that is supported to the housing in the manner shown in Fig. 6. The lifting member is normally restrained against pivotal movement by reason of the stem of the bleeder 130 being seated in the notch of the lifting member 204. The plunger rod 200 is made integral with the needle valve and in its downward position bears lightly on the head of a threaded member 206 that is carried by the follower and is vertically adjustable in alignment with the plunger to adjust the relative normal positions of the needle valve and follower. The other end of the follower is provided with a counter weight 208 that is adjusted to make the follower slightly off balance to follow the needle valve in its upward movement and to exert enough pressure to lift the valve member 130 against the spring 154. The lifting member is provided with an angular pair of diametrically opposed notches 210, on its sides to receive the arms 212 (Fig. 12) of the follower. The angles of the notches on each pair are equal and opposite and have their sides normally equally spaced from the follower arms. Spacing of the arms and notches provides a lost motion connection between the follower and lifting member to allow the follower to move with the needle valve until the upper valve is about closed whence the arms contact with and rotate the lifting member which in turn raises the valve from the notch and opens the bleeder for the purpose above described.

The modification shown in Fig. 5 embodies a change in the position of the suction valve and in the construction of the plunger rod of the link mechanism. In this view the valve is similar to and adapted to function in substantially the manner described with respect to the valve 104 shown in Fig. 4. This valve, however, is slidably supported in a bearing 214 made integral with the bottom wall of the casing 216 and is adapted to be seated in a valve seat 218 formed therein. As a further means of returning the valve to its open position, the valve stem 220 is made of such dimension and is so positioned with respect to the follower that it will force this valve down at substantially the same time that it opens the bleeder valve member 130. The counter weight 208 can be adjusted to give the follower the added pressure required for this purpose.

In this embodiment the link mechanism is similar to the disclosure in Fig. 13 except that the plunger does not form a part of the needle valve, but is arranged in contactual relation therewith. This plunger is supported between the needle valve 222 and follower 202 and is adapted to slide vertically in a tubular guide 224 that is fixedly secured to the threaded member 226. The plunger, guide, and member are affixed to the nipple 54 as a unitary assembly by means of a threaded connection, the member 226 being provided with a flange 228 to limit the upward movement of the assembly. According to this design the housing 230, by-pass tube 198 and link mechanism provide an assembly that could readily be applied to the segregator disclosed in my earlier patent, above referred to, when it is desired to use the same in a fluid suction feed system.

Having thus described my invention, what I claim as new and desire to secure by Letters Patent of the United States is:—

1. The combination with a segregator having a mechanism adapted to segregate non-miscible fluids of different specific gravities flowing therethrough from a source of supply, said mechanism including an automatically controlled valve through which the heavier fluids are discharged, of suction means in communication with said segregator for withdrawing the fluid of lighter specific gravity therefrom, valve means associated with said suction means and said discharge valve for shutting said segregator to atmosphere when said suction means is operative, and means for automatically opening said valve means when said suction means is inoperative.

2. The combination with a segregator having a mechanism adapted to segregate non-miscible fluids of different specific gravities flowing therethrough from a source of supply, said mechanism including an automatically controlled valve through which the heavier fluids are discharged, of suction means in communication with said segregator for withdrawing the fluid of lighter specific gravity therefrom, a valve means automatically actuated by a pressure differential effected by said suction means for preventing the ingress of air into said segregator and opened by the breaking of the vacuum produced by said suction.

3. The combination with a segregator having a mechanism adapted to segregate non-miscible fluids of different specific gravities flowing therethrough from a source of supply, said mechanism including an automatically controlled valve through which the heavier fluids are discharged, of suction means in communication with said segregator for withdrawing the fluid of lighter specific gravity from said segregator, valve means associated with said suction means and said discharge valve and responsive to a pressure differential for automatically shutting said segregator to atmosphere when said suction means is operative and for automatically opening said segregator to atmosphere when said suction means is inoperative.

4. The combination with a segregator having a mechanism adapted to segregate non-miscible fluids of different specific gravities flowing therethrough from a source of supply, said mechanism including an automatically controlled valve through which the heavier fluids are discharged, of suction means in communication with said segregator adapted to establish said flow, valve means associated with said suction means and being so constructed and arranged as to atmospherically seal said segregator to atmosphere when said suction means is operative and to open the same to atmosphere when said suction effect is broken, and further valve means communicating with said segregator and controlled by said segregator mechanism for accelerating the opening of said first-mentioned valve means.

5. The combination with a segregator having a fluid chamber and a float operated valve mechanism disposed within said chamber, said mechanism being adapted to effect a gravitational segregation of non-miscible fluids of different specific gravities flowing therethrough from a source of supply, of suction means in communication with said segregator for withdrawing the fluid of lighter specific gravity therefrom, and valve means cooperating with said suction means and said float operated valve for preventing the ingress of air within said segregator when said suction means is in operation, said valve means being actuated to open position by the agent of gravity when said suction is broken.

6. The combination with a segregator having a fluid chamber and a float operated valve mechanism disposed within said chamber, said mechanism being adapted to effect a gravitational segregator of non-miscible fluids of different specific gravities flowing therethrough from a source of supply, of suction means in communication with said chamber adapted to establish said flow, valve means in communication with said float operated valve and responsive to the suction produced by said suction means for atmospherically sealing said segregator, means carried by said valve mechanism for shutting off said segregator from the suction, and means operatively connected with said valve mechanism for automatically breaking said seal when said suction is shut off.

7. The combination with a segregator having a fluid chamber and a float operated valve mechanism disposed within said chamber, said mechanism being adapted to effect a gravitational segregation of non-miscible fluids of different specific gravities flowing therethrough from a source of supply, of suction means in communication with said segregator for withdrawing the fluid of lighter specific gravity therefrom, a valve means cooperating with said suction means and said float operated valve for preventing the ingress of air within said segregator when said suction means is in operation, automatic means for breaking said seal when the suction produced by said suction means is broken and auxiliary means for accelerating the breaking of said seal in a predetermined position of said float in said chamber.

8. The combination with a segregator having a fluid chamber and a float operated valve mechanism disposed within said chamber, said mechanism being adapted to effect a gravitational segregation of non-miscible fluids of different specific gravities flowing therethrough from a source of supply, said mechanism including an automatically controlled valve through which the heavier fluids are discharged, of suction means in communication with said chamber adapted to establish said flow, valve means in communication with said discharge valve and responsive to the pressure differential effected by said suction means for atmospherically sealing said segregator when said suction means is operative, means for automatically breaking said seal when said suction is broken, and auxiliary means actuated by said float mechanism for accelerating the breaking of said seal in a predetermined position of said float in said chamber.

9. The combination with a segregator having a float chamber and a float operated mechanism disposed within said chamber, said mechanism being adapted to effect the gravitational segregation of non-miscible fluids of different specific gravities flowing therethrough from a source of supply, said mechanism including a discharge valve, of suction means in communication with said chamber adapted to establish said flow, valve means in communication with said discharge valve and automatic means for closing said valve to atmospherically seal said segregator when said suction means is operative, means for automatically breaking said seal when said suction means is inoperative and auxiliary means comprising an air valve and link mechanism cooperating with said float mechanism and air valve for accelerating the breaking of said seal in a predetermined position of said float in said chamber.

10. The combination with a segregator having a float chamber, a float therein, and a valve operated by said float, to effect the gravitational segregation of non-miscible fluids of different specific gravities flowing therethrough from a source of supply, of suction means in communication with said chamber adapted to establish said flow, pressure differentially operated valve means in communication with said float operated valve for atmospherically sealing said segregator when said suction means is operative, automatic means for breaking said seal when said suction is broken and auxiliary means comprising an air valve and link mechanism associated with said float valve and air valve for accelerating the breaking of said seal in a predetermined position of said float in said chamber.

11. In combination a segregator having a float chamber and float mechanism disposed within said chamber, said mechanism including a discharge valve being adapted to effect the gravitational segregation of non-miscible fluids of different specific gravities flowing therethrough from a source of supply, suction means in communication with said chamber adapted to establish said flow, valve means associated with said suction means and said discharge valve for atmospherically sealing said segregator when said suction means is operative and automatic means for breaking said seal when said suction is broken, said valve means including an air passage leading therefrom to the top of said chamber.

12. In combination a segregator having a mechanism including a discharge valve adapted to effect a gravitational segregation of non-miscible fluids of different specific gravities flowing therethrough from a source of supply, suction means adapted to establish said flow, valve means associated with said suction means and said discharge valve for atmospherically sealing said segregator when said sectional means is operative, automatic means for breaking said seal when said suction means is inoperative and means cooperating with said mechanism to control the operation of said suction means.

13. In combination a segregator having a mechanism including a discharge valve adapted to effect a gravitational segregation of non-miscible fluids of different specific gravities flowing therethrough from a source of supply, suction means adapted to establish said flow, valve means responsive to the pressure differential effected by said suction for atmospherically sealing said segregator, automatic means for breaking said seal when said suction means is inoperative and electrical means cooperating with said mechanism to control the operation of said suction means.

14. The combination with a segregator having a float chamber, a float operated valve mechanism disposed within said chamber, said mechanism being adapted to effect the gravitational segregation of non-miscible fluids of different specific gravities flowing therethrough from a source of supply, of electrically operated suction means adapted to establish said flow, valve means for atmospherically sealing said segregator when said suction means is operative and for breaking said seal when said suction means is inoperative so that the segregation of fluid of heavier specific gravity from the fluid of lighter specific gravity may be effected and an electrical circuit, interconnecting said segregator mechanism and said suction means, said circuit being adapted to be broken in a predetermined position of said float mechanism.

15. The combination with a segregator having a float chamber, a float therein, and a valve operated by said float to effect a gravitational segregation of non-miscible fluids of different specific gravities flowing therethrough from a source of supply, of an electrically operated suction pump adapted to establish said flow, valve means for atmospherically sealing said segregator when said suction means is operative and for breaking said seal when said suction means is inoperative so that the segregation of fluid of heavier specific gravity from the fluid of lighter specific gravity may be effected and electric means comprising a switch in circuit with said suction pump and link mechanism cooperating with said float operated valve to break said circuit in a predetermined position of said float.

16. The combination with a segregator having a float chamber, a float mechanism disposed within said chamber, said mechanism including a discharge valve and being adapted to segregate non-miscible fluids of different specific gravities flowing through said chamber from a source of supply, of suction means in communication with said segregator for withdrawing the fluid of lighter specific gravity therefrom, valve means associated with said suction means and in communication with said discharge valve for preventing the ingress of air within said segregator when said suction means is in operation, and further valve means actuated by said mechanism to check the suction effected by said suction means in a predetermined position of said float.

17. The combination with a segregator having a float chamber, a float mechanism disposed therein and adapted to segregate non-miscible fluids of different specific gravities flowing therethrough from a source of supply, including a discharge valve of suction means in communication with said chamber for withdrawing the fluid of lighter specific gravity therefrom, valve means for sealing said segregator against the ingress of air when said suction means is in operation and for breaking said seal when said suction means is inoperative and further valve means cooperating with said float mechanism to check the suction effected by said suction means when a predetermined quantity of heavier fluid has accumulated in said segregator.

18. In combination with a segregator comprising a float chamber having a discharge outlet, a float operated segregator mechanism disposed within said chamber cooperating with said outlet to segregate non-miscible fluids of different specific gravities flowing through said chamber, a storing chamber positioned above said first-mentioned chamber, a suction mechanism in communication with said chambers to establish said flow and to shut off said outlet to atmosphere during the operation thereof, and vent means cooperating with said float chamber and storing chamber to facilitate a displacement of lighter fluid by the heavier fluid, said vent means comprising a port to restrict the gravitational flow from the bottom of said storage chamber to said float chamber substantially in accordance with the rate of flow from said discharge outlet whereby substantially all of the fluid of heavier specific gravity accumulated in said storage chamber is capable of being segregated in a single continuous discharge after the suction mechanism has stopped operating.

19. In combination with a segregator comprising a float chamber having a discharge outlet, a float operated segregator mechanism disposed within said chamber cooperating with said outlet to intermittently effect the gravitational segregation of non-miscible liquids of different specific gravity flowing therethrough, a storing chamber positioned above said float chamber and a by-pass tube projecting upwardly from said float chamber into said storing chamber, said latter mentioned chamber having metering means to restrict the gravitational flow of fluid from said storing chamber to said float chamber substantially in accordance with the rate of flow from said discharge outlet.

20. In a fluid supply system, segregator means for effecting an automatic segregation of fluids of heavier specific gravity from a fluid of lighter specific gravity that is non-miscible therewith, a source of supply and suction means to feed said fluids from said source of supply directly to said segregator means and then to feed the fluid of lighter specific gravity from said segregator to the point of delivery and valve means associated with said segregator means for atmospherically sealing said segregating means when said suction means is operative and thereby prevent loss of fluid from said segregator means.

21. In a fluid supply system, a segregator for effecting an automatic segregation of fluids of heavier specific gravity from a fluid of lighter specific gravity when said fluids are in a non-miscible state, including a chamber provided with an inlet and an outlet, a source of supply and a pump to suction feed the fluids directly through said inlet to the segregator from said source of supply and to conduct the fluid of lighter specific gravity from said segregator through said outlet to the point of delivery and valve means associated with said segregator means for atmospherically sealing said segregating means when said suction means is operative and thereby prevent loss of fluid from said segregator means.

22. In a fluid supply system, a source of supply, a segregator positioned above said source of supply and adapted to automatically segregate fluids of heavier specific gravity from a fluid of lighter specific gravity which fluids normally stratify, an inlet pipe connecting said source of supply to said segregator and having a non-return valve, an outlet for said segregator and a suction pump connected to said outlet to feed first the fluids from said source of supply to said segregator and then the fluid of lighter specific gravity to the point of delivery.

23. In a segregator mechanism adapted to automatically segregate fluids of heavier specific gravities from a fluid of lighter specific gravity, which fluids are suction fed therethrough and normally stratify, a fluid chamber including an outlet opening for the fluid of lighter specific gravity and an outlet opening for the fluid of heavier specific gravity, and valve means in communication with said chamber through said last mentioned outlet openings responsive to the pressure differential produced by said suction in said chamber for closing said chamber to atmosphere and prevent the segregation of accumulated fluid of heavier specific gravity from said fluid chamber when said suction is operative.

24. In a segregator mechanism adapted to segregate fluid of heavier specific gravities from a fluid of lighter specific gravity, which fluids are suction fed therethrough and normally stratify, a fluid chamber including an outlet opening for the fluid of lighter specific gravity and an outlet opening for the fluid of heavier specific gravity, and valve means in communication with said chamber through said last mentioned outlet opening and responsive to the pressure differential produced by said suction in said chamber for closing said chamber to atmosphere and prevent the segregation of accumulated fluid of heavier specific gravity when said suction is operative, said valve means including means to facilitate the breaking of said suction effect.

25. In a segregator mechanism comprising a chamber, a float operated valve mechanism disposed within said chamber and means completely enclosing said float operated valve operated mechanism and spaced substantially entirely from the walls of said chamber, said means comprising an upper deflector, a lower deflector, and a sieve interposed between said upper and lower deflectors.

26. In a segregator mechanism comprising a chamber, a float operated valve mechanism disposed within said chamber and means completely enclosing said valve operated mechanism and spaced substantially entirely from the walls of said chamber, said means comprising an upper deflector, a lower deflector and a sieve interposed between said upper and lower deflectors, said upper deflector having a downwardly projecting flange between the sieve and the wall of said chamber whereby said incoming fluids are directed toward the bottom of the chamber.

27. In a segregator mechanism comprising a chamber having a downwardly and inwardly sloping bottom, a float operated valve mechanism disposed within said chamber and means completely enclosing said valve operated mechanism and spaced substantially entirely from the walls of said chamber, said means including an upper deflector, a lower deflector, and a sieve interposed between said upper and lower deflectors, said lower deflector forming with the bottom of said chamber a sump for the accumulation of foreign matter.

DAVID SAMIRAN.